Sept. 20, 1966 L. E. WOLINSKI 3,274,088
SURFACE TREATMENT OF POLYMERIC SHAPED STRUCTURES
Filed July 27, 1961
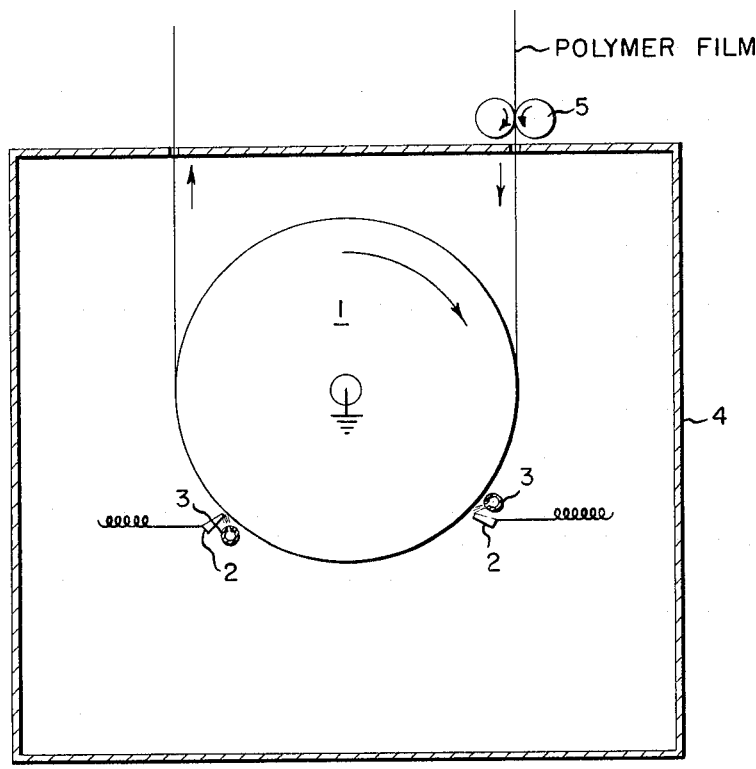
INVENTOR
LEON E. WOLINSKI
BY *A. Ralph Snyder.*
ATTORNEY 3,274,088
SURFACE TREATMENT OF POLYMERIC
SHAPED STRUCTURES
Leon E. Wolinski, Buffalo, N.Y., assignor to E. I. du Pont
de Nemours and Company, Wilmington, Del., a corporation of Delaware
Filed July 27, 1961, Ser. No. 127,242
16 Claims. (Cl. 204—165)

This invention relates to shaped structures of organic fluorocarbon polymers and more particularly to a process for improving the adhesion characteristics of the organic fluorocarbon polymer surfaces.

Films of fluorocarbon polymers are noted for their outstanding weatherability, their excellent chemical resistance and their toughness and high flex life over a broad temperature range. However, the commercial exploitation of fluorocarbon polymers such as polyvinyl fluoride, for example, particularly in laminated structures, is complicated by a general lack of surface adherability. Various surface treatments such as etching with chemical agents as well as electrical discharge treatments in various atmospheres and under prolonged exposure at reduced pressures do provide some improvement in the adherence characteristics of these films. However, reproducibility of treatment by these methods is at times inconsistent and for the production of laminar structures wherein extreme weathering conditions are encountered, a stronger and more permanent bond is required. Despite the considerable amount of effort in this field, the development of surface treatments that will provide such strong bonds remains an elusive but highly desired goal.

It is therefore an object of this invention to provide a process for treating organic fluorocarbon polymers to render them readily adherable to themselves and permanently receptive to adhesives and coatings of all types. It is a further object to provide a simple and economical process for treating organic fluorocarbon polymer films for production of essentially permanent adhesive bonding. The foregoing and related objects will more clearly appear from the description which follows.

These objects are realized by the present invention which, briefly stated, comprises subjecting the surface of a shaped structure of a fluorocarbon polymer containing at least 5 mole percent of recurring structural units having the formula:

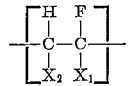

wherein —$X_1$ is a monovalent radical selected from the group consisting of —H, —F, —Cl and —$CF_3$; and —$X_2$ is a monovalent radical selected from the group consisting of —H, —F, —$R_1$ and $R_2$, wherein —$R_1$ is a radical selected from the group consisting of aryl and alkyl radicals having 1 to 8 carbon atoms and —$R_2$ is a radical selected from the group consisting of radicals of the formulae:

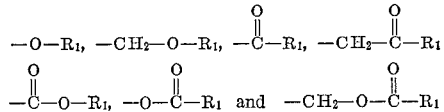

to the action of an electrical discharge in a gaseous atmosphere having a moisture content not in excess of 3.5 grams per cubic meter, measured at 25° C.

While my invention will be hereinafter described primarily as a treatment for films, it should be understood that other shaped structures such as sheets, rods, tubes, woven and non-woven fabrics, filamentary articles, etc., may be similarly treated.

In a preferred embodiment of this invention, illustrated diagrammatically in the accompanying drawing, a continuous web of the fluorocarbon polymer, for example, a continuous self-supporting polyvinyl fluoride film, is passed continuously between a set of spaced electrodes suitably housed in an enclosure 4. The electrodes consist of a rotating metal roll 1 which is connected electrically to ground and constitutes the negative electrode, and one or more positive electrode preferably in the form of stationary metal rods 2 disposed parallel to the longitudinal axis of the roll and connected electrically to a suitable power source (not shown). A gaseous atmosphere consisting essentially of at least one gas selected from the group consisting of oxygen, nitrogen and air having a moisture content preferably not greater than about one gram per cubic meter is fed continuously from spargers 3 through suitable openings therein into the gaps between the positive and negative electrodes. The electrical discharge takes place in the gaseous atmosphere.

In carrying out the surface treatment of this invention, the potential difference between the electrodes (e.g., the stationary metal rod and the rotating roll) may vary from very low voltages in the order of 100 volts up to pulsating peak voltages of 100,000 and above. In general, however, it is preferred to maintain the voltage in excess of 2000 to 3000 volts. Frequencies from 60 cycles per second up to 500,000, or more, cycles per second can be used. Frequencies in the range of 200,000 to 500,000 cycles are preferred in order to obtain effective treatment at commercially acceptable exposure times. The stationary electrode may be in the form of a round, square or tapered rod. It can also be in the form of a hollow metal tube through which a gaseous agent may be introduced to the electrode zone, as described in my copending application, Serial No. 92,329, filed February 28, 1961, now abandoned. The preferred arrangement for this invention is to employ a metal electrode shaped to essentially a knife edge in the direction of the rotating electrode, as shown in the accompanying drawing, and to introduce the gaseous agent into the electrical gap through a separate sparger constructed of an electrically non-conducting material such as polyvinyl chloride.

In general, the effectiveness of the treatment increases with amount of current to the electrodes for a given area of electrode and time of exposure. Current to the electrodes may range up to 5.5 RF (radio frequency) amperes or higher. However, it is preferred to operate in the range of 0.5 RF amperes to 3.5 RF amperes to give reasonable treating times on the one hand, and to avoid rapid degradation of the electrodes at too high currents on the other hand. Power to the high frequency generator may range from 10 watts per lineal inch of the electrode length to 1800 watts per lineal inch of the electrode length. The electrical discharge employed herein, operating within the parameters above specified, has an energy level below 15 electron volts, and is not to be confused with the high or intermediate energy irradiations heretofore used to treat polymeric surfaces.

Time of exposure to the electric discharge treatment is not especially critical and effective treatments are realized at exposure times as short as $1 \times 10^{-5}$ second, and no adverse effects are noted at times as long as 60 seconds. Even longer exposure times can be employed although, for economic reasons, exposure times as short as possible consistent with effective treatment would normally be employed. Preferably the time of exposure of the polymeric surface to the electric discharge treatment should be at least $4 \times 10^{-4}$ second.

The positive and negative electrodes are preferably spaced from about 0.01 inch to about 0.125 inch apart. However, useful results can be obtained when the electrode gap is as low as 0.005 inch or as much as 0.25 inch provided suitable adjustments in such features as amount of current, electrode dimension and exposure time are made.

My invention resides principally in the discovery that improved adhesion is obtained when the gaseous atmosphere supplied to the electrode gap has a moisture content not in excess of 3.5 grams per cubic meter. Best results are obtained when the moisture content of the gaseous agent supplied to the electrode gap is kept below about one gram per cubic meter and this is therefore the preferred mode of operations. As mentioned, the preferred gaseous agents are oxygen, nitrogen, and air, and mixtures thereof. The process, however, is also of advantage where it is desirable to subject the film to the action of an electrical discharge in an atmosphere containing other gases or vapors such as are recited, for example, in my copending U.S. patent applications Serial Nos. 92,329 and 92,330 filed February 28, 1961, now abandoned.

Best results have been obtained by passing the gaseous agent into the electrode gap at rates around 25 cubic feet when treating a 48-inch wide film. Acceptable results were obtained at gaseous flow rates as low as 5 cubic feet per minute. No adverse effects have been observed in the use of flow rates as high as 55–60 cubic feet per minute though again economic considerations would dictate against the use of amounts exceeding those required to produce the desired effect.

In a continuous process, it is necessary to exercise precaution to avoid moisture being carried into the electrode area by the film. To avoid this and to insure a moisture content at the electrodes not in excess of the critical maximum value of 3.5 grams per cubic meter, a preferred method is to pass the incoming film through a set of nip rolls 5 prior to its entrance between the electrodes. Another method is to pass the film over a heated roll just prior to its entering the electrode zone. Still another method is to treat the film with the electric discharge in-line with the film-forming operation so that the temperature of the film is above the temperature of the surroundings as it enters the treating zone and thus avoids deposition of moisture on its surface. Still another method is to conduct the entire treating operation in an enclosure such as a room at very low controlled humidity not exceeding the critical maximum value of 3.5 grams of moisture per cubic meter of air.

The process of the invention is useful for the treatment of self-supporting films and coatings composed of a variety of organic fluorocarbon polymers. Specifically, the process is useful for the treatment of shaped structures of an organic fluorocarbon polymer containing at least 5 mole percent and preferably at least 20 mole percent of recurring structural units depicted by the following structural formula:

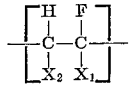

wherein —$X_1$ is a monovalent radical selected from the group consisting of —H, —F, —Cl and —$CF_3$; and —$X_2$ is a monovalent radical selected from the group consisting of —H, —F, —$R_1$ and $R_2$, wherein —$R_1$ is a radical selected from the group consisting of aryl and alkyl radicals having 1 to 8 carbon atoms and —$R_2$ is a radical selected from the group consisting of radicals of the formulae:

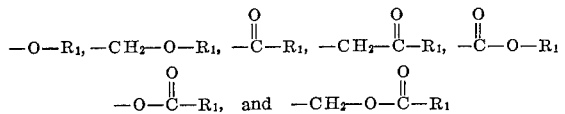

Homopolymers and copolymers of vinyl fluoride and vinylidene fluoride are particularly well suited for treatment by the present invention. Polyvinyl fluoride film, the homopolymer of vinyl fluoride, is a material that has displayed outstanding improvements when treated by the process of the present invention. Polyvinyl fluoride film for treatment may be prepared according to procedures described in U.S. Patents Nos. 2,419,008 and 2,419,010 to Coffman and Ford. However, the fluorocarbon polymers within the aforementioned definition are not limited to polymers of vinyl fluoride and vinylidene fluoride.

The polymers in which may be found recurring structural units within the above definition and which may be successfully treated according to the process of this invention are found in the following three groups:

*Group 1.*—The homopolymers and interpolymers of fluorinated ethylenes such as vinyl fluoride, vinylidene fluoride, 1,2-difluoroethylene, trifluoroethylene, 1-fluoropropylene and 1,1-difluoropropylene;

*Group 2.*—Interpolymers of the fluorinated ethylenes of Group 1 with perhalofluorinated ethylenes such as tetrafluoroethylene, hexafluoropropylene and chlorotrifluoroethylene; and

*Group 3.*—Interpolymers of the fluorinated ethylenes of Group 1 or of the perhalofluorinated ethylenes of Group 2 with monoethylenically unsaturated monomers copolymerizable therewith selected from the following: mono-ethylenic hydrocarbons such as ethylene, propylene, isobutylene, butene-1, butene-2, stilbene and styrene; halogen-substituted mono-ethylenic hydrocarbons such as vinyl chloride, vinyl bromide, 1,1-dichloroethylene, difluorochloroethylene and trifluorochloroethylene; vinyl esters such as vinyl formate, vinyl acetate, vinyl propionate, vinyl butyrate, vinyl benzoate, vinyl pivalate, vinyl stearate, vinyl silicylate and vinyl esters of inorganic acids; vinyl ethers such as vinyl ethyl ether, butyl vinyl ether, methyl allyl ether, tetrafluoroethyl allyl ether, and vinyl dioxolane; vinyl ketones such as methyl vinyl ketone and ethyl allyl ketone, N-vinyl imides such as N-vinyl succinimide and N-vinyl phthalimide; acrylic and methacrylic acids and their derivatives such as their esters, nitriles, amides, anhydrides and acid halides, including methyl methacrylate, ethyl acrylate, betahydroxyethyl methacrylate, allyl methacrylate, acrylonitrile, N-butyl methacrylamide, etc., derivatives of maleic and fumaric acids such as diethyl maleate and dimethyl fumarate; propenyl esters such as allyl acetate and isopropenyl acetate; and polymers of chlorinated and chlorosulfonated polyethylene. The preferred copolymers are those of vinyl fluoride and vinylidene fluoride in which the aforementioned compounds comprise at least 20% by weight.

The following specific examples of certain preferred embodiments will serve to further and more fully illustrate the principles and practice of this invention.

*Example 1*

A one-half mil thick oriented film (48 inches wide) of polyvinyl fluoride was passed at a speed of 20 feet per minute between the electrodes of an electric discharge apparatus shown schematically in FIGURE 1. One of the electrodes was a rotating metal roll connected to ground and covered to a thickness of 20 mils with "Mylar" * polyester film. Two separate stationary electrodes, positioned about 90° apart, were spaced 0.025 inch from the metal surface of the rotating roll. Each of the stationary electrodes was connected to a Model #2 High Frequency Spark Generator. A current of approximately 1.9 RF (radio-frequency) amperes was provided to each of the electrodes and power input to each of the generators was 1200 watts. The electrodes consisted of brass rods tapered to an essential edge of approximately 1/32 inch. To remove the boundary layer of air on the film surface, the film was passed through a set of rubber nip rolls just prior to its passage between the electrodes. An atmosphere of dry oxygen (below 0.8 gram per cubic meter) was passed through the sparger into the electrode gaps at a rate of 27 cubic feet per minute. The sparger for introducing the gaseous at-

---

* Du Pont trademark.

mosphere into the electrode gap consisted of two-inch diameter polyvinyl chloride tubes with No. 80 holes (.0135 inch) drilled on one-fourth inch centers along the length of the spargers corresponding to the width of the film.

To test the adherability of the treated surface a layer of adhesive consisting of a 30% solution of a 97.8% methyl methacrylate/2.2% ammoniated glycidyl methacrylate copolymer in a solvent mixture of about 3 parts of isopropanol with 7 parts of toluene was applied to the surface of two test pieces, the surfaces bearing the adhesive were air dried to volatile the solvent therefrom and they were then pressed together for 10 minutes under a pressure of 150 p.s.i. at 180° C. Bond strength was determined by a test, which consists in scoring the film with a sharp knife and then trying to pry up and peel back an edge of the film. A "good" laminate is one in which the peeling cannot be started. For convenience this is termed a CNS bond. To simulate the hydrolytic attack of outdoor weathering exposure the laminate was then subjected to an accelerated test by immersion in boiling water and the length of time to failure noted. The laminate described above showed no degradation in bond strength after having been boiled for 1000 hours.

As a control, a film of the same specifications and treated as described above, but with an oxygen atmosphere containing approximately 5 grams of moisture per cubic meter gave a film which on formation into a laminate survived only 80 hours of boiling. A second control laminate made from film treated as above except that the oxygen atmosphere contained 10 grams of moisture per cubic meter survived only 12 hours of boiling.

*Example 2*

The procedure of Example 1 was repeated except that one of the stationary electrodes was spaced 0.0755 inch from the metal surface of the rotating roll and connected to a higher capacity Lepel High Frequency Spark Generator, Model #6, set to a power input of 1600 watts.

A laminate made with the same adhesive system and following the same procedure likewise showed no degradation in boiling water for 1000 hours.

*Example 3*

A one-mil thick film of oriented polyvinyl fluoride was treated according to the procedure of Example 1 with the exception that nitrogen containing 0.5 gram of moisture per cubic meter was used as the gaseous agent and the rotating electrode was used without the dielectric covering.

The treated surface was coated with a layer of adhesive comprising 10 parts of Epon 828 and 3 parts Epon U, the adhesive bearing surfaces were pressed together for 10 minutes at 120° C. at a pressure of 75 pounds per square inch. The laminate showed no evidence of adhesion failure after 1000 hours in boiling water.

*Example 4*

The experiment of Example 3 was repeated except that dry air (1 gram of moisture per cubic meter) was used in place of nitrogen as the gaseous agent. The laminate likewise showed no evidence of adhesion failure after 1000 hours in boiling water.

A control film of polyvinyl fluoride treated as described above but with air containing 10 grams of moisture per cubic meter, measured at 25° C., gave a film which on formation into a laminate with the Epon 828/Epon U adhesive system failed after 10 hours in boiling water.

*Example 5*

Using the same equipment as described in Example 1 but with 6-inch long stationary electrodes, a 1.5 mil thick film of clear polyvinyl fluoride 6 inches wide was treated at a speed of 1000 feet per minute. Dry oxygen (0.8 gram of moisture per cubic meter) was passed between the electrodes at a rate of 12 cubic feet per minute. The generator was set to deliver 3.2 RF amperes of current to each of the electrodes.

Laminates made with the same adhesive and under the same procedure as described in Example 1 were not degraded after 1000 hours in boiling water.

In a parallel experiment, air containing one gram per cubic meter was used in place of dry oxygen with essentially the same results.

In a control experiment carried out exactly as described above but in which the moisture content of the air was approximately 5 grams per cubic meter the treated film gave a laminate which failed in boiling water after about 80 hours.

*Examples 6–14*

Following the procedure described in Example 1 the films described in the following table were treated in an electric discharge under the atmospheres noted and the resistance of the laminates to the boiling water test was determined. The results are shown in the following table.

TABLE I

| Example | Film | Gaseous Atmosphere | Moisture Content, g./m.$^3$ | Boil Life (hours) |
|---|---|---|---|---|
| 6 | Polyvinyl Fluoride, 15% Rutile TiO$_2$ | Air | 1.0 | 1,000+ |
| 7 | Green Opaque Polyvinyl Fluoride; 15% total pigment; 94% Rutile TiO$_2$, 3% Chrome Yellow, 2% Lamp Black, 1% Monastral Green; 2 mils thick. | Oxygen | 2.2 | 500 |
| 8 | Copolymer of Vinyl Fluoride/Vinylidene Fluoride (89.5/10 mole percent), 2 mils thick. | Nitrogen | 1.5 | 700 |
| 9 | Copolymer of Vinyl Fluoride/Vinyl Acetate (92/8 mole percent), 4 mils thick. | Oxygen | 0.5 | 1,000+ |
| 10 | Copolymer of Vinyl Fluoride/Tetrafluoroethylene (92.5/7.5 mole percent), 2 mils thick. | Air | 1.0 | 1,000+ |
| 11 | Copolymer of Vinyl Fluoride/Hexafluoropropene (94.9/5.1 mole percent) 3 mils. | Oxygen | 0.8 | 1,000+ |
| 12 | Copolymer of Vinyl Fluoride/Ethylene (14.7/85.3 mole percent), 2 mils thick. | Nitrogen | 1.2 | 1,000 |
| 13 | Polyvinylidene Fluoride (3 mils thick) | Oxygen | 0.8 | 1,000+ |
| 14 | Copolymer of Tetrafluoroethylene/Ethylene (50/50 mole percent), 2 mils thick. | Air | 2.0 | 400 |

As controls for the examples listed above, the same films were treated in an electrical discharge with the same gaseous atmospheres except that the moisture content of the respective gaseous atmospheres was maintained at about 5 grams/cubic meter. Corresponding film laminates made from these treated films showed a boiling life ranging from 60 to 80 hours.

The principal advantage of this invention is that it provides a means of obtaining polyvinyl fluoride, polyvinylidene fluoride and other fluorocarbon polymer films having outstanding adherability performance in laminates and other coated structures. The treatments are reliable and structures having outstanding weatherability are obtainable with predicted reproducibility. Furthermore, the equipment for carrying out these treating operations is simple and easily operated.

Through the process of this invention films of fluorocarbon polymers such as polyvinyl fluoride are provided which are highly adhereable to adhesives thus permitting the manufacture of a wide variety of laminates. Such laminates may be employed advantageously as exterior siding, sheathing, roofing materials for houses and other buildings, interior panels for walls, ceilings and floors, outdoor furniture, outdoor signs, interior furniture of various descriptions, especially where protection from spilled liquids is desired; boat hulls, insulating panels, trailer cars, permanent awnings, forms for concrete, counter tops, doors, window frames, ducted work, containers for storage and shipment of corrosive materials, Venetian blinds and certain parts of airplane structure.

I claim:

1. A process for modifying and improving the surface characteristics of shaped structures of fluorocarbon polymers which comprises subjecting the surface of a shaped structure of a fluorocarbon polymer containing at least 5 mole percent of recurring structural units having the formula:

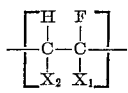

wherein —$X_1$ is a monovalent radical selected from the group consisting of —H, —F, —Cl and —$CF_3$; and —$X_2$ is a monovalent radical selected from the group consisting of —H, —F, —$R_1$ and $R_2$, wherein —$R_1$ is a radical selected from the group consisting of aryl and alkyl radicals having 1 to 8 carbon atoms and —$R_2$ is a radical selected from the group consisting of radicals of the formulae:

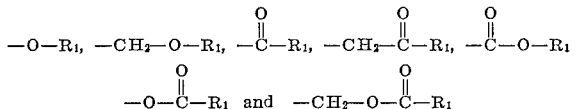

to the action of an electrical discharge maintained at a voltage in excess of 2000 volts and having an energy level below 15 electron volts in a gaseous atmosphere having a moisture content not in excess of 3.5 grams per cubic meter, measured at 25° C.

2. The process of claim 1 wherein said gaseous atmosphere consists essentially of at least one gas selected from the group consisting of nitrogen, oxygen, and air.

3. The process of claim 1 wherein said shaped structure is a film.

4. A process for modifying and improving the surface characteristics of continuous film of fluorocarbon polymers which comprises passing continuous film of a fluorocarbon polymer containing at least 5 mole percent of recurring structural units having the formula:

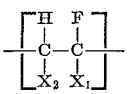

wherein —$X_1$ is a monovalent radical selected from the group consisting of —H, —F —Cl, and —$CF_3$; and —$X_2$ is a monovalent radical selected from the group consisting of —H, —F, —$R_1$ and $R_2$, wherein —$R_1$ is a radical selected from the group consisting of aryl and alkyl radicals having 1 to 8 carbon atoms and —$R_2$ is a radical selected from the group consisting of radicals of the formulae:

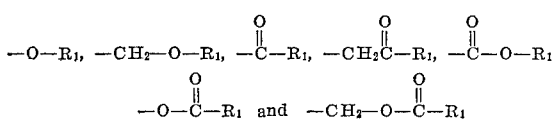

between spaced positive and negative electrodes while maintaining between said electrodes an electrical discharge and a gaseous atmosphere consisting essentially of at least one gas selected from the group consisting of nitrogen, oxygen, and air, said gaseous atmosphere having a moisture content not in excess of 3.5 grams of moisture per cubic meter, measured at 25° C.

5. The process of claim 4 wherein the moisture content of said gaseous atmosphere is not in excess of about one gram of moisture per cubic meter, measured at 25° C.

6. A process for modifying and improving the surface characteristics of films of fluorocarbon polymers which comprises continuously passing a continuous film of a fluorocarbon polymer containing at least 5 mole percent of recurring structural units having the formula:

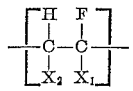

wherein —$X_1$ is a monovalent radical selected from the group consisting of —H, —F, —Cl and —$CF_3$; and —$X_2$ is a monovalent radical selected from the group consisting of —H, —F, —$R_1$ and $R_2$, wherein —$R_1$ is a radical selected from the group consisting of aryl and alkyl radicals having 1 to 8 carbon atoms and —$R_2$ is a radical selected from the group consisting of radicals of the formulae:

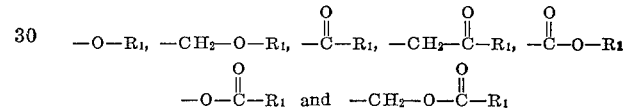

between parallel positive and negative electrodes spaced to provide a gap therebetween of from 0.005 to 0.25 of an inch, continuously applying to said positive electrode an alternating current of from 0.5 to 5.0 RF amperes at a voltage in excess of 2000 volts, and at a frequency in the range of 200,000 to 500,000 cycles per second effective to create an electrical discharge therebetween, and maintaining between said electrodes a gaseous atmosphere consisting essentially of at least one gas selected from the group consisting of nitrogen, oxygen, and air, said gaseous atmosphere having a moisture content below 3.5 grams per cubic meter measured at 25° C. for a period of time sufficient to activate the surface.

7. The process of claim 6 wherein the moisture content of said gaseous atmosphere is not in excess of about one gram of moisture per cubic meter, measured at 25° C.

8. The process of claim 6 wherein said gas is oxygen.

9. The process of claim 6 wherein said gas is nitrogen.

10. The process of claim 6 wherein said gas is air.

11. The process of claim 6 wherein said film is polyvinyl fluoride film.

12. The process of claim 6 wherein said film is polyvinylidene fluoride film.

13. The process of claim 6 wherein said film is a copolymer of vinyl fluoride and vinyl acetate.

14. The process of claim 6 wherein said film is a copolymer of vinyl fluoride and tetrafluoroethylene.

15. The process of claim 6 wherein said film is a copolymer of vinyl fluoride and hexafluoropropylene.

16. The process of claim 6 wherein said film is a copolymer of tetrafluoroethylene and ethylene.

References Cited by the Examiner

UNITED STATES PATENTS

| | | | |
|---|---|---|---|
| 2,864,755 | 12/1958 | Rothacker | 204—165 |
| 2,935,418 | 5/1960 | Berthold et al. | 204—168 |
| 3,057,792 | 10/1962 | Frohlich | 204—165 |

JOHN H. MACK, *Primary Examiner.*

JOHN R. SPECK, WINSTON A. DOUGLAS, *Examiners.*

H. WILLIAMS, *Assistant Examiner.*